(12) United States Patent
Guo et al.

(10) Patent No.: US 10,231,051 B2
(45) Date of Patent: Mar. 12, 2019

(54) INTEGRATION OF A SMARTPHONE AND SMART CONFERENCE SYSTEM

(71) Applicant: International Business Machines Corporation, Armonk, NY (US)

(72) Inventors: Shang Q. Guo, Cortlandt Manor, NY (US); Jonathan Lenchner, North Salem, NY (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 15/489,020

(22) Filed: Apr. 17, 2017

(65) Prior Publication Data

US 2018/0302715 A1  Oct. 18, 2018

(51) Int. Cl.
| | |
|---|---|
| *H04R 3/12* | (2006.01) |
| *G10L 15/26* | (2006.01) |
| *H04R 27/00* | (2006.01) |
| *H04R 3/00* | (2006.01) |
| *G06F 3/0484* | (2013.01) |
| *H04N 5/232* | (2006.01) |
| *H04N 7/14* | (2006.01) |
| *F21V 21/15* | (2006.01) |

(Continued)

(52) U.S. Cl.
CPC ............. *H04R 3/12* (2013.01); *F21V 21/15* (2013.01); *G06F 3/0484* (2013.01); *G10L 15/265* (2013.01); *H04N 5/23216* (2013.01); *H04N 7/147* (2013.01); *H04R 3/005* (2013.01); *H04R 27/00* (2013.01); *F21W 2131/40* (2013.01); *H04R 2499/11* (2013.01); *H04W 88/02* (2013.01)

(58) Field of Classification Search
CPC .......... H04R 3/12; H04R 3/005; H04R 27/00; H04R 2499/11; H04N 7/15; H04N 7/152; H04N 7/155
USPC ....................................................... 348/14.01
See application file for complete search history.

(56) References Cited

U.S. PATENT DOCUMENTS

| | | | | |
|---|---|---|---|---|
| 8,358,328 B2 * | 1/2013 | Friel | ......................... | H04N 7/15 |
| | | | | 348/14.01 |
| 9,538,011 B1 * | 1/2017 | Sherman | ................... | H04R 5/04 |

(Continued)

FOREIGN PATENT DOCUMENTS

WO  2009065542 A1  5/2009

OTHER PUBLICATIONS

Crowd Mics Demo—YouTube, Accessed Online: Apr. 17, 2017, 2 Pages. URL:https://www.youtube.com/watch?v=7HvN42Q-kqQ.

(Continued)

*Primary Examiner* — David Ton
(74) *Attorney, Agent, or Firm* — Cantor Colburn LLP; Rahan Uddin

(57) ABSTRACT

Embodiments are directed to a computer-implemented method and computer system for using a smartphone. A non-limiting example of this method includes receiving an audio input on the smart phone. The audio input is converted to a first digital signal. The first digital signal is transmitted along with location information of the smartphone. The first digital signal is configured to be used as a microphone input for a public address system. The location information is configured to be used to position an automated spotlight.

16 Claims, 4 Drawing Sheets

(51) Int. Cl.
F21W 131/40 (2006.01)
H04W 88/02 (2009.01)

(56) References Cited

U.S. PATENT DOCUMENTS

| | | |
|---|---|---|
| 2008/0285772 A1 | 11/2008 | Haulick et al. |
| 2009/0189977 A1 | 7/2009 | Delia et al. |
| 2015/0082194 A1 | 3/2015 | Rai |
| 2016/0050504 A1 | 2/2016 | Browne |
| 2016/0142875 A1 | 5/2016 | Awoniyi-Oteri et al. |

OTHER PUBLICATIONS

Crowd Mics, The ATOM, "Phones become microphones with one box, the ATOM", Accessed Online: Apr. 17, 2017, 3 Pages. URL: http://crowdmics.com/the-atomCrowd MicsCrowd Mics.
Wikipedia, "Indoor positioning system", Accessed Online: Apr. 17, 2017, 11 pages. URL:https://en.wikipedia.org/wiki/Indoor_positioning_system.

* cited by examiner

INTEGRATION OF A SMARTPHONE AND SMART CONFERENCE SYSTEM

BACKGROUND

The present invention generally relates to the field of computing. More specifically, the present invention relates to ways for smartphones to interact with smart conference systems.

Smartphones have become important pieces of technology that many people carry on a regular basis. During a public conference, such as an educational seminar, a speech, a meeting, a class, and the like, there is commonly a person who is talking to an audience. As part of such a conference, the presenter may desire to interact with the audience by receiving questions from the audience. Presently, that situation is handled in one of a variety of different manners. The questions might just be shouted at the presenter, which can require the presenter to repeat the question because other audience members might not have been able to hear the question. The conference administrator might provide a microphone for use by the audience. However, such a microphone has to be passed around from audience member to audience member and can be time consuming. Furthermore, it might not always be evident to other audience members where the person who is speaking is located, which can be disconcerting.

SUMMARY

Embodiments are directed to a computer-implemented method for using a smartphone. A non-limiting example of this method includes receiving an audio input on the smart phone. The audio input is converted to a first digital signal. The first digital signal is transmitted along with location information of the smartphone. The first digital signal is configured to be used as a microphone input for a public address system. The location information is configured to be used to position an automated spotlight.

Embodiments are directed to a computer system. The computer system includes a memory and a processor system communicatively coupled to the memory. The processor system is configured to perform a method. A non-limiting example of this method includes receiving an audio input. The audio input is converted to a first digital signal. The first digital signal is transmitted along with location information of the smartphone. The first digital signal is configured to be used as a microphone input for a smart conference system. The location information is configured to be used to position an automated spotlight.

Embodiments are directed to a computer-implemented method for sending and receiving audio. A non-limiting example of this method includes receiving a digital signal comprising audio data. The digital signal is received by one of the one or more user smartphones. The digital signal further comprises audio data and further comprises location information. Thereafter converting the digital signal into a first audio signal. Thereafter causing audio playback of the first audio signal. Finally, using the location information to control a position of an automated spotlight.

Additional features and advantages are realized through techniques described herein. Other embodiments and aspects are described in detail herein. Embodiments and aspects of the invention are described in detail herein and are considered a part of the claimed subject matter. For a better understanding, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
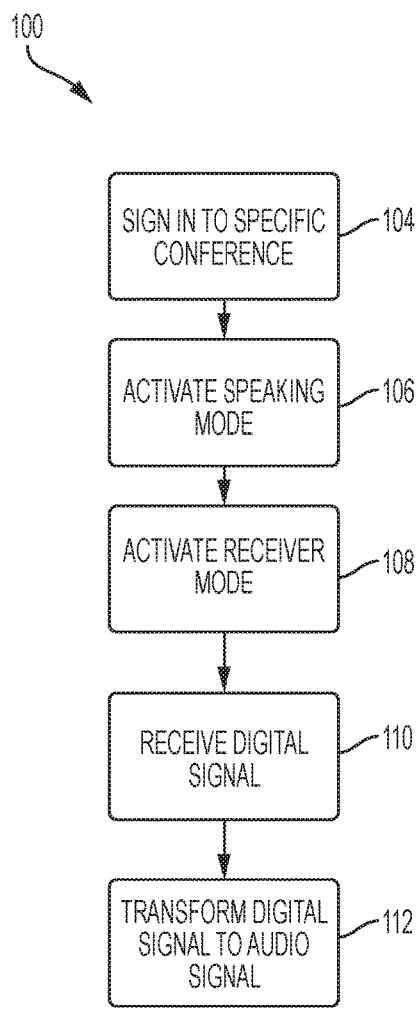
FIG. 1 depicts a flow diagram illustrating the operation of one or more exemplary embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the immediately present application, including the corresponding features and combinations of features depicted in the figures amount to significantly more than implementing a method of using a smartphone to as an audio input and as a locator for a smart conference system. Additionally, at least the features and combinations of features described in the immediately following paragraphs, including the corresponding features and combinations of features depicted in the figures go beyond what is well understood, routine and conventional in the relevant field(s).

As discussed above, in a typical conference or seminar, a presenter or group of presenters will give a presentation to an audience. There might be a portion of the conference dedicated to receiving questions or comments from audience members. This portion of the conference can involve the presenter receiving questions shouted at them from audience members. In some conferences, an audience microphone is set up for audience members to use to ask their questions. The audience microphone can be set up in a special area that audience members approach in order to ask a question. Alternatively, the audience microphone can be passed around to audience members to ask their questions.

There are drawbacks to such approaches. For example, extra costs are incurred for each additional microphone. In addition, extra time is used passing the microphone to each audience member who wishes to speak.

Turning now to an overview of aspects of the invention, one or more embodiments of the present invention address the above-described shortcomings by using a novel method and system to allow a user's smartphone to be used for capturing audio at a conference and transmitting the audio directly to the audio/visual system of a conference room. The user's smartphone can be used as a microphone, as a location input for a lighting system, and as a headphone jack. Additional features can be used, such as receiving text questions, and providing other types of feedback.

Many smartphones have audio input capability in the form of one or more microphones built-in to the smartphone or coupled to the smartphone, audio output capability in the form of speakers (or coupled to external devices through headphone jacks, Bluetooth connectivity, and the like), location services (such as access to Global Positioning System (GPS), Global Navigation Satellite System (GLONASS), WiFi positioning systems (WPS), indoor positioning systems (IPS) and the like), and communication capability (cellular, EDGE, UMTS, 3G, CDMA, GSM, 4G, LTE, LTE Advanced, WiMAX, WiFi, and the like). These capabilities are used to provide an enhanced conference experience. It should be understood that, while reference is being made to a "smartphone," embodiments are not so limited. Any type of device can be used, including a tablet, electronic reader, desktop computer, laptop computer, personal digital assistant, and the like. In general, any device that has the capability to transmit location and digital audio signals, the capability to receive digital audio signals, and the capability to convert audio signals to digital signals can be used in an embodiment.

The smartphone can be configured to use the smartphone's audio input as a microphone that connects to a smart conference system. The smartphone would be able to receive audio input from a user (such as by speaking into the smartphone's microphone). Thereafter, the smartphone would be configured to convert the audio data into digital data. The smartphone would then be configured to transmit the digital data. The transmission can occur via one of a variety of different methods, such as via web or peer-to-peer streaming to the mixer or audio switcher of the smart conference system. In some embodiments, the transmission is received by an administrator system under the control of the conference administrator, then coupled to the mixer or audio switcher of the audio conference system. The term conference administrator can be used to refer to any person who is using an embodiment of the invention to facilitate a conference. In some use cases, this can be the presenter. In other use cases, this can be an assistant to the presenter. In other use cases, this can be a person specifically tasked with this function. This system would be configured to receive the digital data, then be able to perform various processing of the digital data. In some embodiments, the system would be configured to convert the digital data back to audio data, then broadcast the audio data over a public address system that is being used for the conference. In some embodiments, the digital data can further be processed to convert the speech into text. Thereafter, the text can be displayed by the system.

One advantage of having a central location for audience members to ask questions is that other audience members know who is asking the question. In another aspect of an embodiment, the location of the person speaking can be used for lighting purposes. This can be accomplished in one of a variety of different methods, both now known or developed in the future. A variety of location services, such as GPS, GLONASS, IPS, or WPS can be used to determine the location of the audience member who is speaking using the smartphone. Thereafter, the location information can be transmitted to the smart conference system. The location information can be input to an automated spotlighting system to shine a spotlight on the user who is speaking. An automated spotlight system is a system that is configured to shine a spotlight at a location determined by the automated spotlight system. In an embodiment, the automated spotlight system is configured to shine a spotlight at the location of the smartphone. In addition, the location can be used to point a camera or video camera to the location of the smartphone. In such a manner, a video image of the audience member who is speaking can be displayed to the conference attendees.

In another aspect of an embodiment, the audio output capabilities of a smartphone can be utilized to provide a better conference experience for audience members. Rather than solely relying on the public address system of the conference system, a smart conference system can stream the audio output via the web, or in peer to peer fashion, so that an audience member can use the audio output capabilities of his or her smartphone to hear the proceedings. In this manner, the audience member is able to play audio at a sound level that is appropriate for their hearing comfort level.

It should be understood that, although there are references to "conferences," embodiments are not so limited. Embodiments can be used in any situation in which loudspeakers or a public address system are used and lighting is automated. Such situations can include seminars, conferences, lectures, meetings, classes, and the like. Settings can be public or private, commercial or educational.

Figure 3:
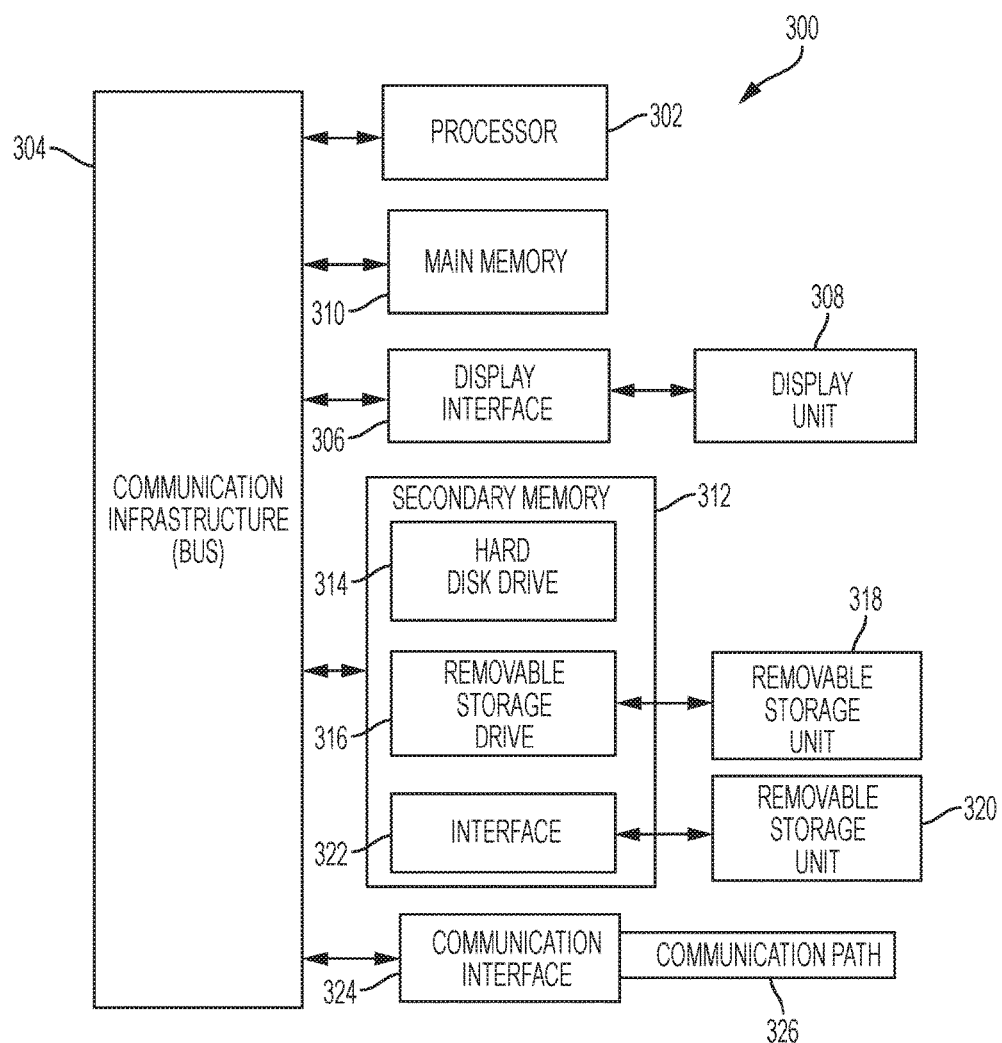
FIG. 3 depicts a computer system capable of implementing hardware components of one or more exemplary embodiments.

Turning now to a more detailed description of aspects of the present invention, FIG. 1 depicts a flowchart illustrating a method 100 according to embodiments of the invention. Method 100 is merely exemplary and is not necessarily limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In some embodiments, portions of method 100 can be implemented by system 300 (FIG. 3).

Method 100 presents a flow diagram for the usage of an embodiment by an audience member. An audience member signs in to a specific conference (block 104). Because embodiments can be used in a facility with multiple different events occurring simultaneously (for example, a classroom building), there is ideally a method for each audience member to indicate which event the audience member is interested in attending. This can occur in one of a variety of different manners. In some embodiments, a code can be manually entered by a user. Each event (such as each classroom) can have a different code with a predetermined length (for example, a 4-digit code). The conference administrator would let the audience members know which code to enter for each particular event. In some embodiments, a bar code or a QR code can be publicized by the conference administrator. An audience member would scan the bar code or QR code with his phone (such as with a camera built-in to his smartphone) in order to sign-in to the correct event. Other methods can be used to allow a user to sign-in.

During a presentation, the conference administrator can control when audience members are permitted to speak. When the conference administrator enables audience participation, an audience member may indicate their desire to speak using their smartphone. The conference room app will then enter the given audience member into a queue of audience members who wish to speak. The user's smartphone microphone does not become "live" to the audience (i.e., actively engaged with the smart conference system) until it is the given audience member's turn to speak. Once it is the given audience member's turn to speak, their smartphone app indicates this fact to them and their speaking mode (block 106) is activated. Thereafter, when the given audience member speaks into their phone the audio is transmitted to the smart conference system system and in turn broadcast via a loudspeaker or other audio transmission means to the audience.

In addition, the position of the audience member who is speaking is tracked using one of a variety of location services, such as GPS, GLONASS, IPS, or WPS in conjunction with the smartphone. This location information is sent to the smart conference system and a spotlight that is under the control of the smart conference system is configured to shine on the audience member who is speaking. In addition to a spotlight, other devices can be controlled in a similar manner. For example, a video camera can be controlled in conjunction with the spotlight. In such a manner, an image of the audience member who is speaking can be shown to the entire conference.

An embodiment can perform a variety of other tasks also. For example, an embodiment can take the audio stream captured from the audience member's smartphone and transcribe the audio stream into text. Thereafter, the text can be displayed via the smart conference system.

The audience member also has the ability to activate a mode wherein the smartphone is used as an audio receiver (block 108). The audience member activates the mode in one of several different manners, such as activating a button (a physical button or a "soft" button) on his smart phone. Thereafter, the user's smartphone receives a digital signal (i.e., an audio stream) from the conference system. This digital signal can be configured to receive the digital signal via WiFi, Bluetooth, or via cellular communication standards such as 4G and LTE. The user's smartphone transforms the digital signal into an audio signal that can be played back via one of a variety of different audio transducers (block 112). For example, the audience member can connect a pair of headphones, headset, earphones, monitors, and the like to the smartphone. The connection can be wired (such as via a USB port, headphone jack, or Lightning port, or the like) or wireless (such as via Bluetooth). In such a manner, the audience member can ensure that he can hear the content at a proper volume (for example, not too loud by using noise-canceling headphones, or at an increased volume for the hearing impaired).

Figure 2:
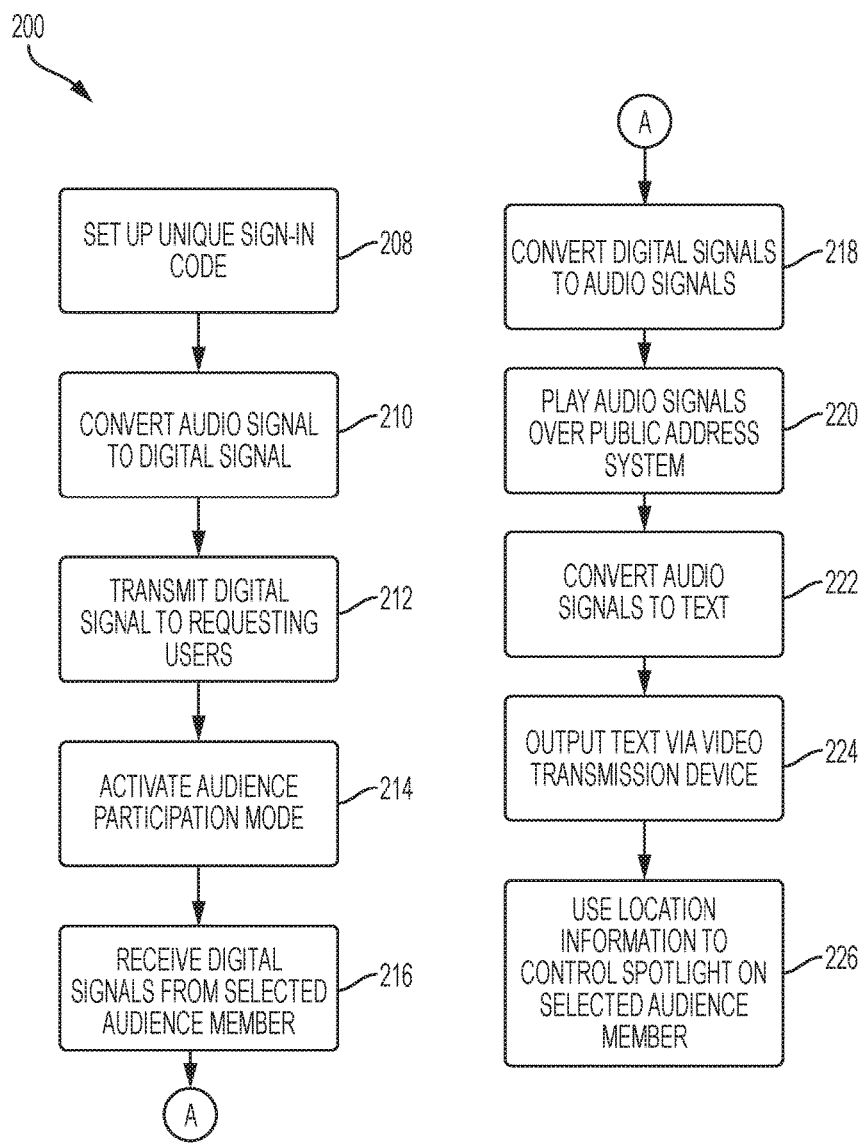
FIG. 2 depicts a flow diagram illustrating the operation of one or more exemplary embodiments.

A flowchart illustrating method 200 is presented in FIG. 2. Method 200 is merely exemplary and is not necessarily limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In some embodiments, portions of method 200 can be implemented by system 300 (FIG. 3).

Method 200 illustrates the operation of an embodiment as being operated by a conference administrator. In some configurations, the conference administrator will have an administrator system or an administrator device that is under the control of the conference administrator. In other configurations, a smart conference system can accomplish these tasks.

The conference administrator sets up a unique code such that audience members can sign in to the specific meeting (block 208). The code can be displayed such that users are able to enter or scan the code to join in the appropriate meeting. Thereafter, the conference administrator conducts the meeting (or classroom or the like) in a traditional manner. The teacher, presenter, or the like speaks into a microphone for broadcast over the A/V or PA system and possibly uses visual aids displayed via a projector, monitor, or television.

While the presenter is speaking into the microphone, the smart conference system converts the audio signal of the presentation into a digital signal (block 210). Thereafter, the digital signal is sent to any user who had signed in to the meeting (block 212). Sending the digital signal can be via any number of manners. Typically, because the digital signal is being sent to a smartphone, the digital signal is sent via WiFi or cellular communication standards, though any transmission method can be used. The digital signal can be received by an audience member's smartphone who had entered the unique code and then be transformed into an audio signal for playback.

When the conference administrator activates an audience participation mode (block 214), the smart conference system receives digital signals from the smartphone of a selected audience member (such as via WiFi or via cellular communication) (block 216). Typically, the microphone of only one audience member is active at any one time. The manner in which the audience members are chosen is discussed in further detail below.

The digital signals contain digital representation of audio signals generated, for example, by the audience member speaking into a microphone built-in to or attached to a smartphone. The smart conference system receives the digital signals and converts them into audio signals (block 218). Thereafter, the audio signals can be, for example, played on a PA system or A/V system to which the smart conference system is coupled (block 220). The audio signals can also be converted into text, using one of a variety of speech to text algorithms (block 222). Thereafter, the text can be output (block 224). The output can be coupled to a television, monitor, projector, or the like and the text can be output.

In addition, the smart conference system receives a location of the smartphone that is currently active (from which the administrator device is receiving a digital signal). The smart conference system translates the location into instructions for an automated spotlight system (block 226). In such a manner, the automated spotlight system can direct a spotlight at the audience member who is speaking.

A variety of other capabilities are possible in various embodiments. For example, a queue can be set up. As discussed above, an audience member can request permission to speak via the smartphone through the smart conference system. The situations described above assume that only one audience member wants to speak. Sometimes, more than one audience member may desire to speak. In such a case, a queue can be established. The queue can be as simple as a first come, first served queue, in which the position in the queue is established by the time at which each audience member requested permission to speak. When an audience member reaches the top of the queue, his smartphone's microphone becomes active. In some embodiments, the user is notified (such as by vibration of the smartphone or other notification) before the microphone becoming active. In such a case, each person in the queue can be shown their position in the queue. There can also be an option for each user to remove themselves from the queue (for example, an audience member might have a question for the conference administrator, but the conference administrator answered the question for another audience member).

In some embodiments, the conference administrator can have the ability to change the order of the queue. In such a manner, the conference administrator can have a list of members of the queue. The conference administrator can change the order of the queue such that certain audience members move ahead of other audience members, for example to avoid the possibility that a given audience member dominates the conversation. In conjunction with such a feature, the audience members can have the ability to enter the topic of his question or comment. The conference administrator can use the entered topics to change the order of the queue (for example, changing the order of the queue such that questions about a first topic are handled together and questions about a second topic are handled together.) In addition, audience members who are in a queue can be periodically polled. In other words, audience members in the queue can be asked if they would like to remain in the queue or if their question has already been answered.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. Computer system 300 can have one of a variety of different form factors, such as a desktop computer, a laptop computer, a tablet, an e-reader, a smartphone, a personal digital assistant (PDA), and the like.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
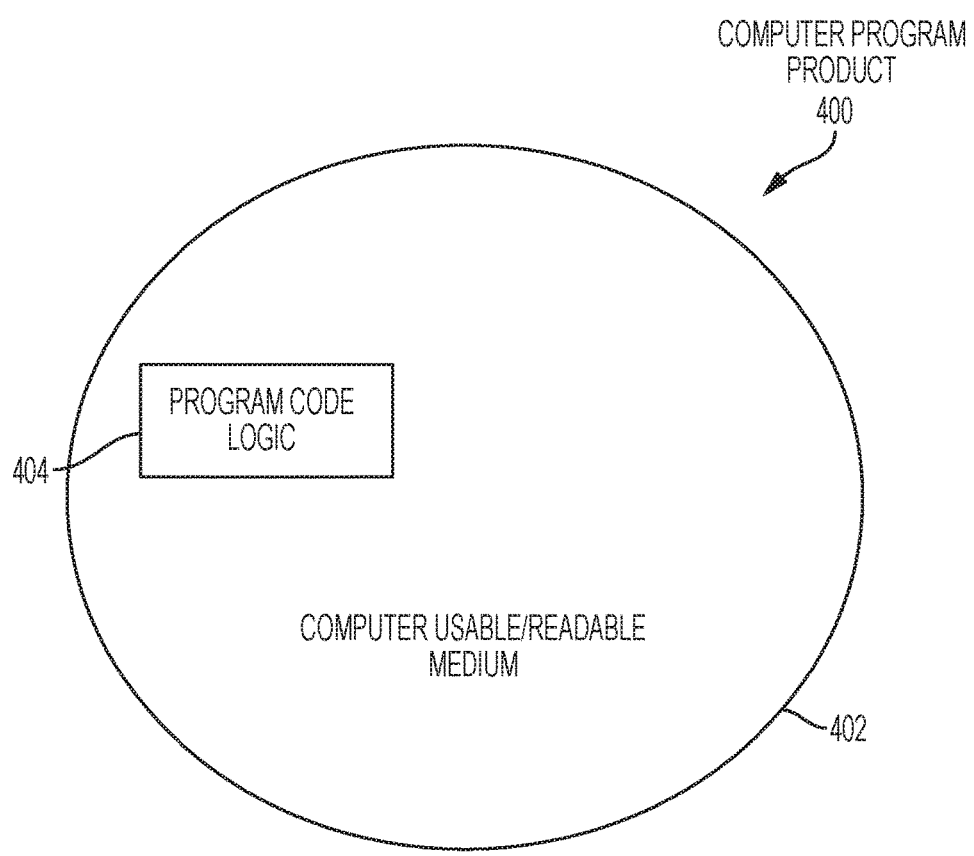
FIG. 4 depicts a diagram of a computer program product according to one or more exemplary embodiments.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method for using a smartphone, the method comprising:
    receiving, by a processor, an audio input on the smartphone;
    requesting of the user, by the processor, an indication of an intended topic of conversation;
    converting, by the processor, the audio input to a first digital signal; and
    transmitting, by the processor, the first digital signal along with location information of the smartphone; wherein
    the location information is further utilized to position an external video camera to point in the direction of a person speaking over their smartphone; and
    outputting the first digital signal as a microphone input to a public address system and positioning an automated spotlight using the location information.

2. The computer-implemented method of claim 1, further comprising:
    receiving, by the processor, a second digital signal;
    converting, by the processor, the second digital signal to a received audio signal; and
    causing a playback, by the processor, of the received audio signal.

3. The computer-implemented method of claim 1, further comprising:
    receiving, by the processor, the indication of an intended topic of conversation; and
    receiving, by the processor, an instruction to enter an audio receiving queue, wherein the instruction to enter the audio receiving queue is received by a smart conference system that is configured to control a plurality of smartphones in addition to a plurality of house microphones dedicated for use within the smart conference system, using a queue; and wherein:
    transmitting the first digital signal occurs when the smartphone has reached a head of the audio receiving queue.

4. The computer-implemented method of claim 1, further comprising:
    causing, by the processor, the display of an indication of the position in the queue; and
    causing, by the processor, the display of an indication that a head of the queue has been reached and the audio receiving mode is active.

5. The computer-implemented method of claim 1, wherein the audio is input via a microphone internal to the smartphone.

6. A computer system, comprising:
    a memory; and
    a processor system communicatively coupled to the memory;
    the processor system configured to:
        receive an audio input;
        request an indication of a topic of conversation;
        convert the audio input to a first digital signal;
        transmit the first digital signal along with location information of the computer system;
        output the first digital signal as a microphone input for a public address system and position an automated spotlight using the location information; and
        position an external video camera using the position information; wherein
        the computer system is embodied as a smartphone.

7. The computer system of claim 6, wherein the processor system is further configured to:
    receive a second digital signal;
    convert the second digital signal to a received audio signal; and
    cause a playback of the received audio signal.

8. The computer system of claim 6, wherein the processor system is further configured to:
    receive an indication of a topic of conversation
    receive an instruction to enter an audio receiving queue, wherein the instruction to enter the audio receiving queue is received from an administrator system that is configured to control a plurality of smartphones using a queue;
    wherein:
    transmitting the first digital signal occurs when the computer system has reached a head of the audio receiving queue.

9. The computer system of claim 6, wherein the processor system is further configured to:
    causing, by the processor, the display of an indication that a head of the queue has been reached and the audio receiving mode is active.

10. The computer system of claim 6, wherein the audio is input via a microphone internal to the computer system.

11. A computer-implemented method for sending and receiving audio signals, the method comprising:
    receiving, by a processor, a digital signal comprising audio data, wherein the digital signal is received from one of the one or more user smartphones, and wherein the digital signal further comprises location information;
    requesting, by the processor, an indication of a topic of conversation;
    causing, by the processor, audio playback of the first audio signal;
    positioning an automated spotlight, by the processor, using the location information; and
    positioning an external video camera to point in the direction of a person speaking over their smartphone.

12. The computer-implemented method of claim 11, further comprising:
- creating, by a processor, a code for use by one or more user smartphones;
- converting, by the processor, a second audio signal into a broadcast digital signal;
- transmitting, by the processor, the broadcast digital signal for playback by at least one of the one or more user smartphones that have used the code.

13. The computer-implemented method of claim 11, further comprising:
- prior to receiving the digital signal comprising audio data, receiving, by the processor, a request to transmit the digital signal;
- placing, by the processor, the request in a queue; and wherein:
- receiving the digital signal occurs when the request becomes a top request in the queue.

14. The computer-implemented method of claim 13, further comprising:
- allowing, by the processor, a manipulation of the queue by an administrator;
- receiving, by the processor, a request to enter a queue; and further wherein:
- transmitting the first digital signal occurs when the smartphone has reached a head of the audio receiving queue.

15. The computer-implemented method of claim 11, wherein:
- causing audio playback of the first audio signal comprises transmitting the first audio signal to a public address system coupled to the processor.

16. The computer-implemented method of claim 11, further comprising:
- converting, by the processor, the digital signal into text using a speech to text algorithm; and
- causing the display of the text.

* * * * *